United States Patent
Kumar et al.

(10) Patent No.: US 9,473,359 B2
(45) Date of Patent: Oct. 18, 2016

(54) TRANSACTIONAL TRAFFIC SPECIFICATION FOR NETWORK-ON-CHIP DESIGN

(71) Applicant: NetSpeed Systems, San Jose, CA (US)

(72) Inventors: Sailesh Kumar, San Jose, CA (US); Eric Norige, East Lansing, MI (US); Pier Giorgio Raponi, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 204 days.

(21) Appl. No.: 14/298,717

(22) Filed: Jun. 6, 2014

(65) Prior Publication Data

US 2015/0358211 A1  Dec. 10, 2015

(51) Int. Cl.
*H04L 12/24* (2006.01)
*H04L 12/733* (2013.01)
*H04L 12/933* (2013.01)

(52) U.S. Cl.
CPC ......... *H04L 41/145* (2013.01); *H04L 41/0806* (2013.01); *H04L 45/122* (2013.01); *H04L 49/109* (2013.01)

(58) Field of Classification Search
None
See application file for complete search history.

(56) References Cited

U.S. PATENT DOCUMENTS

| | | |
|---|---|---|
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,223,098 B1 * | 4/2001 | Cheong ............ B07C 5/344 209/571 |
| 6,249,902 B1 | 6/2001 | Igusa et al. |
| 6,415,282 B1 | 7/2002 | Mukherjea et al. |
| 6,542,739 B1 * | 4/2003 | Garner ........... H04B 7/18539 455/1 |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |
| 7,818,151 B2 * | 10/2010 | Coskun ............... G03F 7/705 703/6 |
| 7,917,885 B2 | 3/2011 | Becker |
| 8,050,256 B1 | 11/2011 | Bao et al. |
| 8,059,551 B2 | 11/2011 | Milliken |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Bunjob Jaroenchonwanit
(74) *Attorney, Agent, or Firm* — Procopio, Cory, Hargreaves & Savitch LLP

(57) ABSTRACT

Example implementations described herein are directed to a consolidated specification with information to generate and optimize the NoC. The consolidated specification can also facilitate the generation of traffic trace files. Based on the trace files, performance simulation where packets are injected in the NoC can be conducted. The consolidated specification can include parameters for bandwidth, traffic, jitter, dependency information, and attribute information depending on the desired implementation.

18 Claims, 12 Drawing Sheets

(56) References Cited

U.S. PATENT DOCUMENTS

| | | | |
|---|---|---|---|
| 8,099,757 B2* | 1/2012 | Riedl | H04N 21/2385 725/114 |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0066029 A1* | 3/2008 | Chen | G06F 17/50 716/106 |
| 2008/0072182 A1 | 3/2008 | He et al. | |
| 2008/0120129 A1 | 5/2008 | Seubert et al. | |
| 2008/0244135 A1* | 10/2008 | Akesson | G06F 13/1626 710/241 |
| 2009/0070726 A1 | 3/2009 | Mehrotra et al. | |
| 2009/0187395 A1* | 7/2009 | Manohar | H04L 41/145 703/17 |
| 2009/0268677 A1 | 10/2009 | Chou et al. | |
| 2009/0313592 A1* | 12/2009 | Murali | G06F 17/5045 716/113 |
| 2010/0040162 A1 | 2/2010 | Suehiro | |
| 2011/0035523 A1 | 2/2011 | Feero et al. | |
| 2011/0060831 A1 | 3/2011 | Ishii et al. | |
| 2011/0063093 A1* | 3/2011 | Fung | G06Q 10/04 340/10.52 |
| 2011/0072407 A1 | 3/2011 | Keinert et al. | |
| 2011/0085550 A1* | 4/2011 | Lecler | H04L 45/245 370/392 |
| 2011/0154282 A1 | 6/2011 | Chang et al. | |
| 2011/0191774 A1* | 8/2011 | Hsu | G06F 17/50 718/100 |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0109874 A1* | 5/2012 | Balog | G01R 31/318314 706/60 |
| 2012/0110541 A1 | 5/2012 | Ge et al. | |
| 2012/0155250 A1 | 6/2012 | Carney et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0148506 A1* | 6/2013 | Lea | H04L 47/32 370/236 |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2015/0256486 A1* | 9/2015 | Boucard | H04L 45/245 370/392 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2014/012003, Mar. 26, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

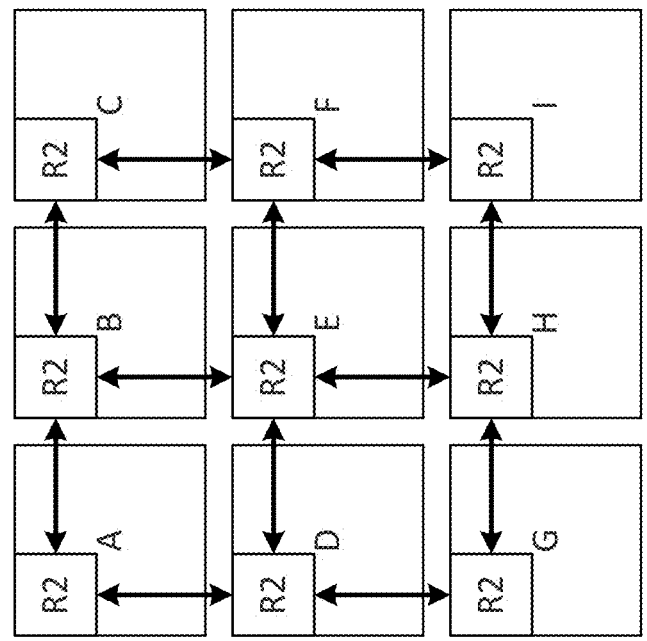
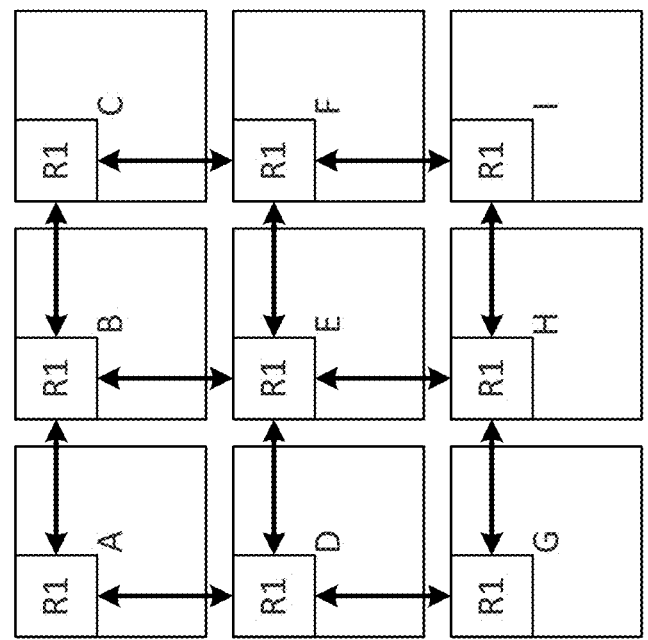
FIG. 3(a)

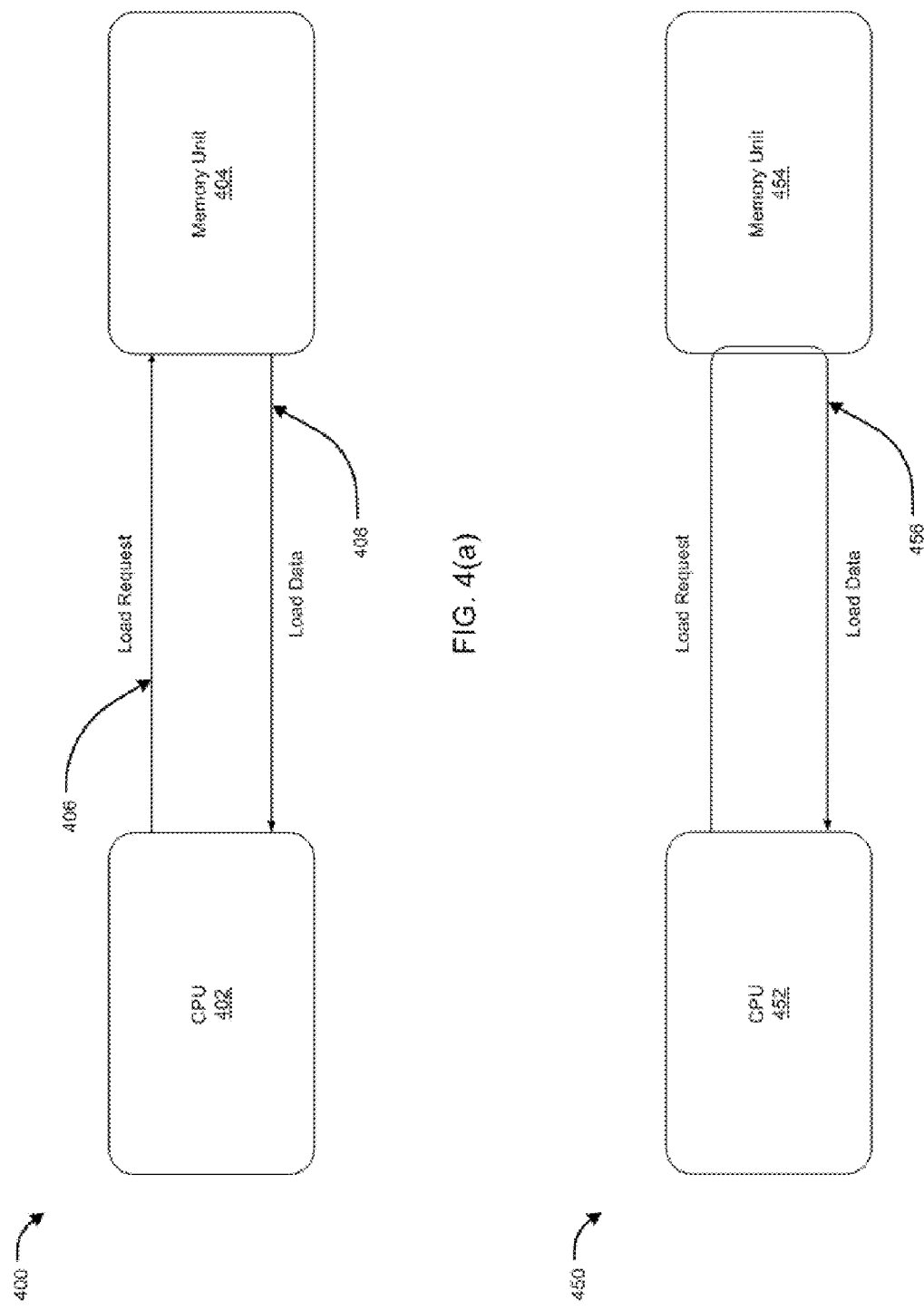

TRANSACTIONAL TRAFFIC SPECIFICATION FOR NETWORK-ON-CHIP DESIGN

BACKGROUND

1. Technical Field

Methods and example implementations described herein are generally directed to interconnect architecture, and more specifically, to a transactional traffic specification that can be used for NoC design and simulation.

2. Related Art

The number of components on a chip is rapidly growing due to increasing levels of integration, system complexity, and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs).

VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic flows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer which is then routed to the destination on the same NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers of different layers, wherein, for instance a router connected to host in the first layer is shown as R1, and a router connected to the same host in the second layer is shown as R2. In this example, the multi-layer NoC is different from the 3D NoC. In this case multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right combination of routers, channels, and interconnections for a given system remains a challenge and time consuming manual process, often resulting in sub-optimal and inefficient designs.

System on Chips (SoCs) are becoming increasingly sophisticated, feature rich, and high performance by integrating a growing number of standard processor cores, memory & I/O subsystems, and specialized acceleration IPs. To address this complexity, the Network-on-Chip (NoC) approach of connecting SoC components is gaining popularity. A NoC can provide connectivity to a plethora of components and interfaces and simultaneously enable rapid design closure by being automatically generated from a high level specification. The specification describes the interconnect requirements of the SoC in terms of connectivity, bandwidth and latency. In addition to this, information such as position of various components, protocol information, clocking and power domains, etc. may be supplied. A NoC compiler can then use this specification to automatically design a NoC for the SoC. A number of NoC compilers were introduced in the related art that automatically synthesize a NoC to fit a traffic specification. In such design flows, the synthesized NoC is simulated to evaluate the performance under various operating conditions and to determine whether the specifications are met. This may be necessary because NoC-style interconnects are distributed systems and their dynamic performance characteristics under load are difficult to predict statically and can be very sensitive to a wide variety of parameters.

FIG. 4(a) illustrates an exemplary system 400 with two hosts and two flows represented as an exemplary flow-level specification. Such flow-level specifications are usually in the form of an edge-weighted digraph, where each node in the graph is a host in the network, and where edges represent traffic sent from one node to another. Furthermore, weights indicate the bandwidth of the traffic. Such a specification is sometimes annotated with latency requirements for each flow, indicating a limit on transfer time. System 400 illustrates connection between a first host such as a CPU 402 and a second host such as a memory unit 404 with two traffic flows (406 and 408) between them, wherein the first flow is a 'load request' 406 from CPU 402 to memory 404, and the second flow is 'load data' 408 sent back from memory 404 to CPU 402.

This traffic flow information is described in the specification of the NoC and is used for designing and simulating the NoC. The specification that describes the flow level information may be called hereafter as flow-level specification. The known flow level specifications may have the following two limitations in addition of other un-cited limitations. The first limitation of the known flow level specification is that the information included therein may not be enough for creating a deadlock free routing between hosts of SoC through the NoC. Though the flow level specification includes information on external dependencies between ports of different hosts, information on internal dependencies of hosts and/or messages/packets are not included. The second limitation of flow level specification is that network simulations performed using point to point traffic represented by the flows in flow level specification may not be sufficient enough, or may be inaccurate because of other missing information such as the inter-dependency information. Flow-based simulation allows each host to transmit packets independent of other hosts' behavior. The traffic correlation caused by the request/response protocols may have a significant impact on network behavior.

There is therefore a requirement for a NoC that can provide a specification that contains traffic flow information so as to facilitate better design and simulation. There is also a need for a transaction-based specification that utilizes a traffic specification for integrated NoC specification, design, and performance evaluation so as to specify the bandwidth and latency of traffic as well as inter-dependency between messages and capture the inter-dependencies, traffic is specified as transactions, with each transaction having multiple point-to-point hops.

SUMMARY

The present disclosure is directed to a non-transitory computer readable medium storing instructions for generating/creating/designing a Network on Chip (NoC) based system from a transactional traffic specification. In an aspect, such a transactional traffic specification can include a plurality of parameters indicative of information configured to facilitate a design and performance simulation of the NoC based system. In an example implementation, a NoC of the NoC based system can be generated from the transactional traffic specification to meet specification requirements.

In an example implementation, a transactional traffic specification can provide information to generate and optimize the NoC and can include transaction based entries when compared with flow level entries of the flow level specification of the existing arts. Such a transactional traffic specification can include a plurality of parameters and information indicative/defining information on connectivity, dependency, bandwidth, latency, traffic jitter, attributes and other required information that can be used for designing and/or simulating the NoC.

An example implementation of the present disclosure provides a system for NoC design and simulation using the transaction traffic specification. An example implementation of present disclosure can also provide a transactional traffic specification that can facilitate generation of traffic trace files based on which a design performance simulation can be conducted.

The foregoing and other objects, features and advantages of the example implementations will be apparent and the following more particular descriptions of example implementations as illustrated in the accompanying drawings wherein like reference numbers generally represent like parts.

BRIEF DESCRIPTION OF THE DRAWINGS

FIG. 3(a) illustrates an example of a related art two layer NoC interconnect.

FIG. 4(a) illustrates an exemplary system with two hosts and two flows represented according to an exemplary flow-level specification.

FIG. 4(b) represents an exemplary system having two flows between two hosts as a single transaction in accordance with an embodiment of the present disclosure.

DETAILED DESCRIPTION

Figure 1A:
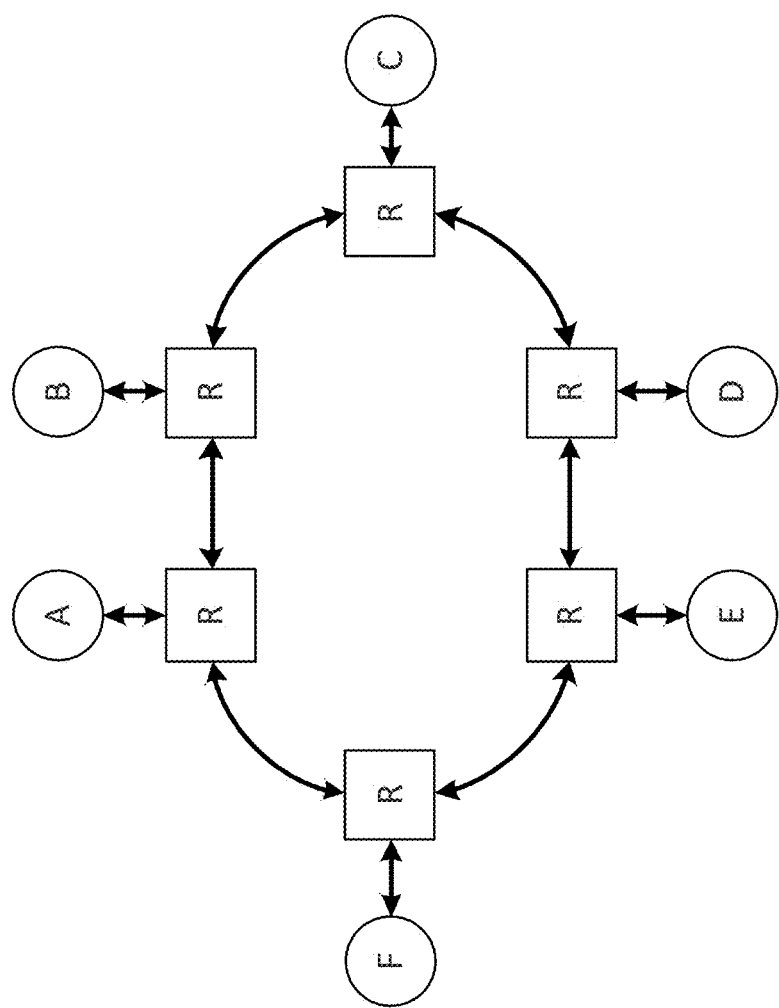
FIGS. 1(a), 1(b), 1(c) and 1(d) illustrate examples of Bidirectional ring, 2D Mesh, 2D Torus, and 3D Mesh NoC Topologies.
Figure 1B:
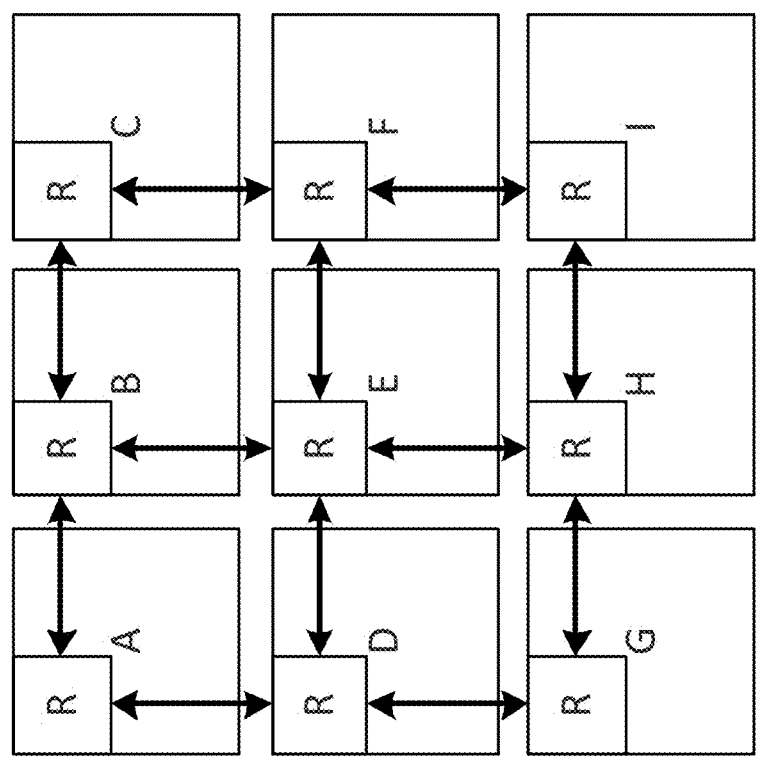
Figure 1C:
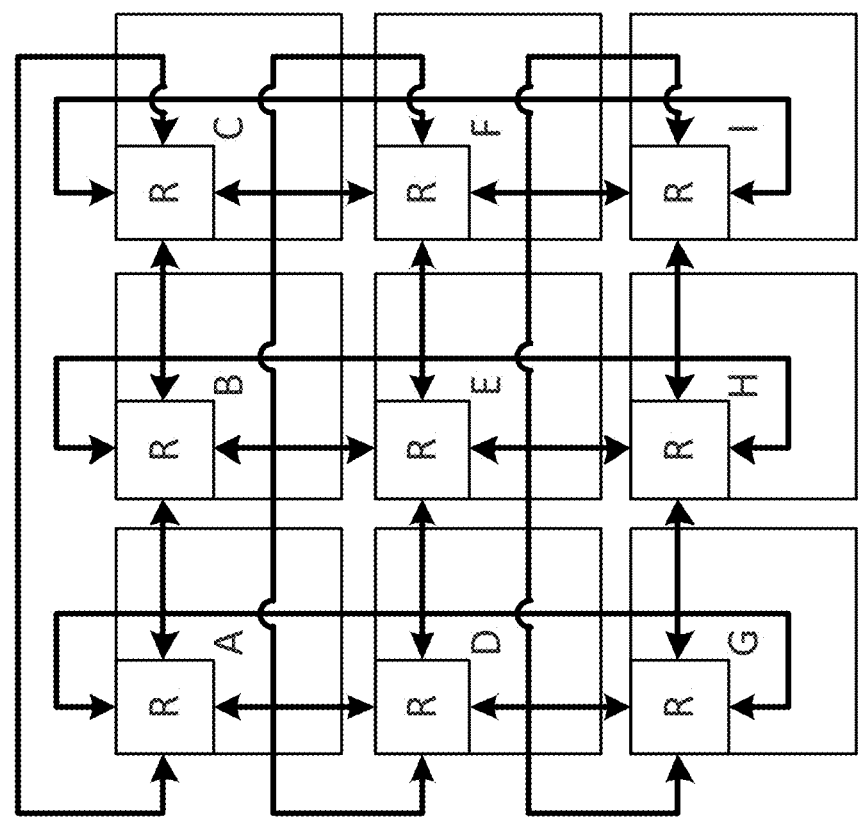
Figure 1D:
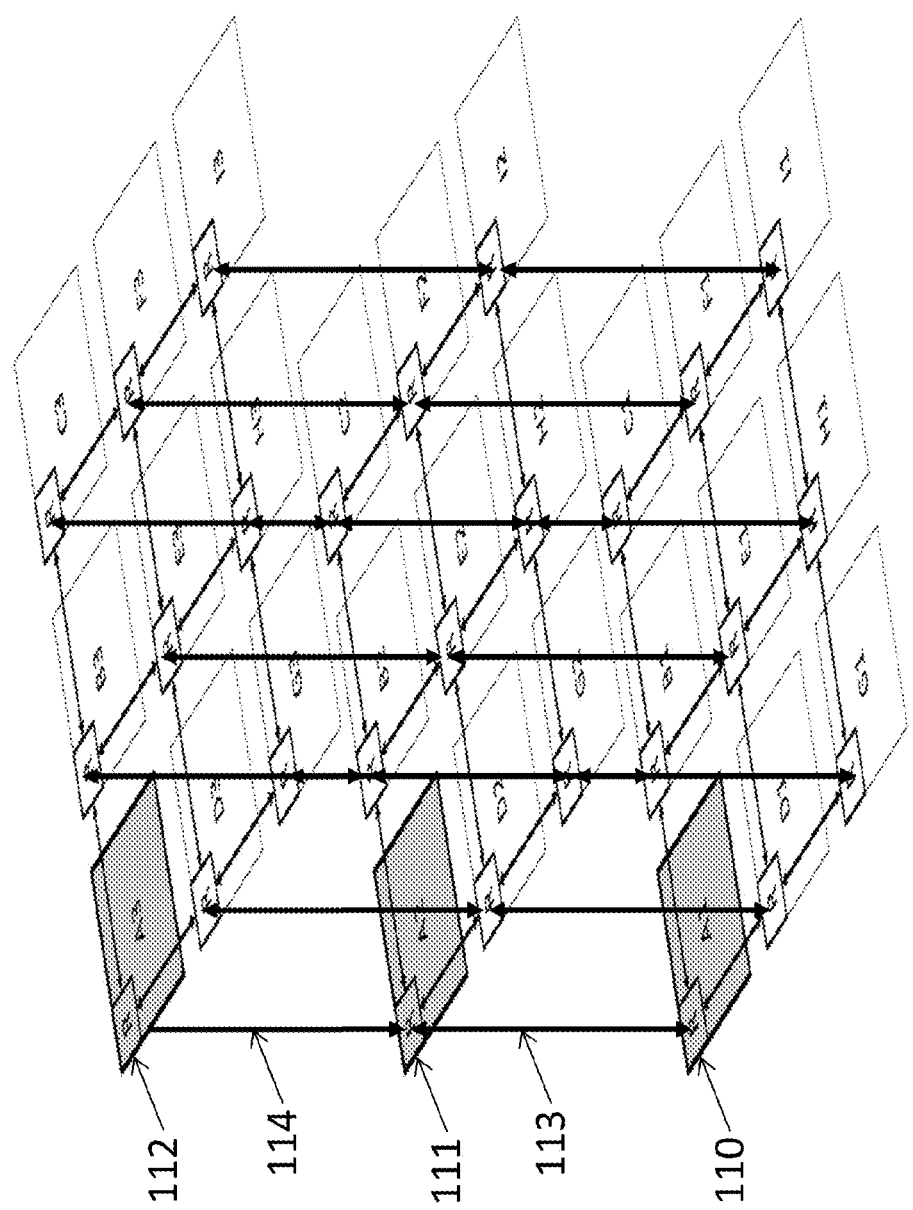
Figure 2A:
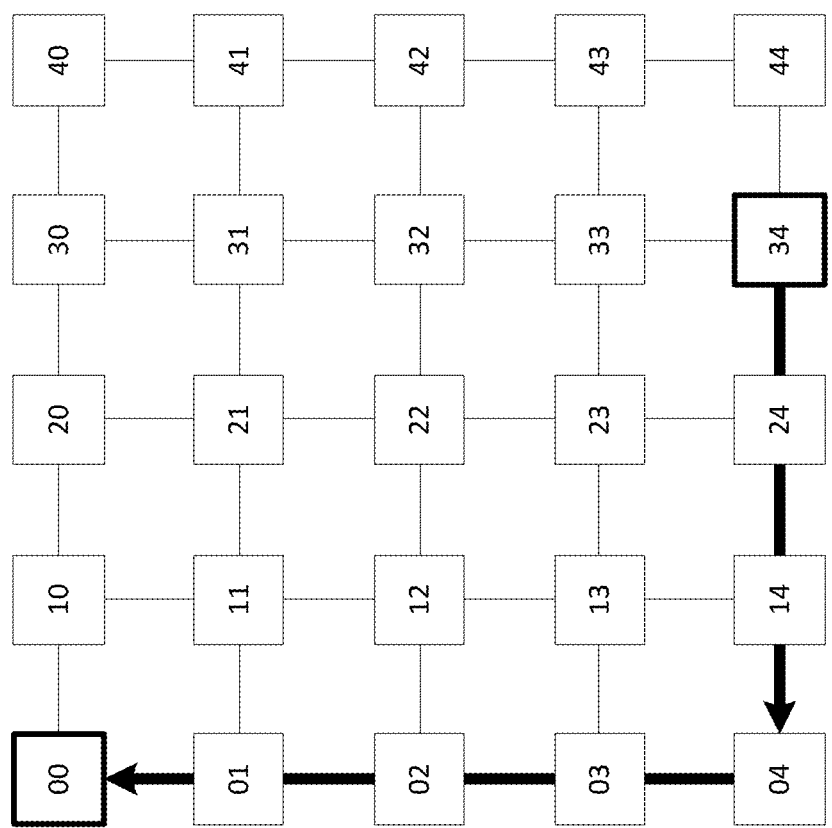
FIG. 2(a) illustrates an example of XY routing in a related art two dimensional mesh.
Figure 2B:
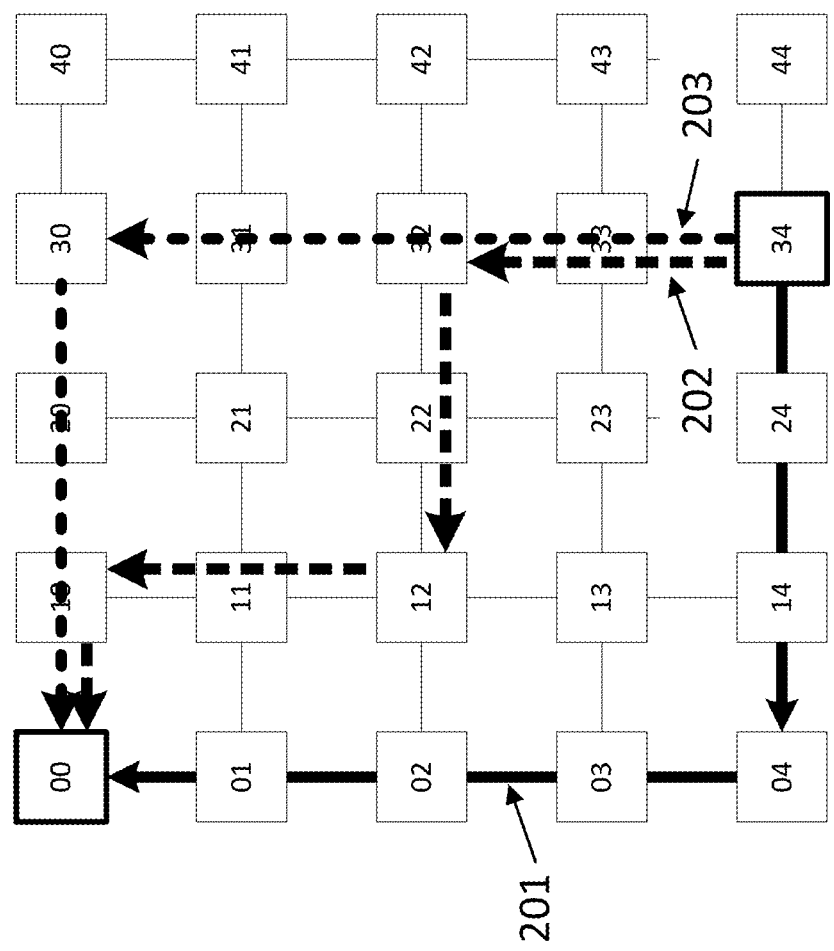
FIG. 2(b) illustrates three different routes between a source and destination nodes.
Figure 3B:
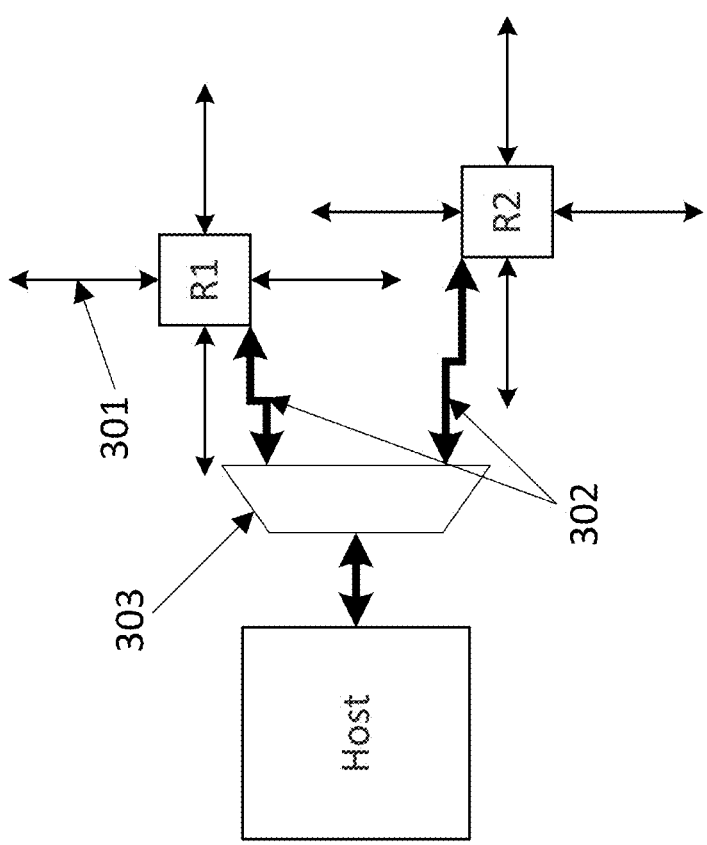
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations described herein are directed to a non-transitory computer readable medium storing instructions for generating/creating/designing a Network on Chip (NoC) based system from a transactional traffic specification comprising a plurality of parameters. In an example implementation, transactional traffic specification includes a plurality of parameters indicative of information configured to facilitate performance simulation of the NoC based system, wherein NoC of the NoC based system can be generated from the specification to meet specification requirements.

Example implementations described herein are directed to a transactional traffic specification with information to generate and optimize the NoC. Such a transactional traffic specification may utilize a traffic specification for integrated NoC specification, design, and performance evaluation. The transactional traffic specification includes one or more transaction-based entries when compared with flow level entries in the flow level specification. The transactional traffic specification can further comprise information including, but not limited to, information on connectivity, dependency, bandwidth, latency, traffic jitter, attributes and other required information that can be used for designing and/or simulating the NoC. The transactional traffic specification can also facilitate generation of traffic trace files based on which the performance simulation where packets are injected in the NoC can be conducted.

An example implementation of the proposed system describes a NoC that is provides with a transactional traffic specification, which specification can be used to better design and simulation of NoC and its performance/operation.

As described above, in the known example implementations, NoC traffic requirements are specified by using a flow-level specification. These types of specifications are usually represented in the form of an edge-weighted digraph, where each node in the graph is a host in the network. Each edge of the edge-weighted diagraph represents traffic sent from one node to another, and the weights indicate bandwidth of that traffic. This type of specification is sometimes annotated with latency requirements for each flow, indicating a limit on transfer time.

Example implementations described herein are directed to a transaction-based traffic specification, wherein the specification can specify bandwidth and latency of traffic as well as inter-dependency between messages and/or hosts. In order to capture inter-dependencies, traffic can be specified as transactions, with each transaction having details of multiple point-to-point hops and the inter dependencies. Example implementation further relate to a non-transitory computer readable medium storing instructions for executing a process, wherein the instructions include the steps of generating a Network on Chip (NoC) based system from a specification. The proposed specification can include a plurality of parameters that are indicative of information configured to facilitate performance simulation of the NoC based system, wherein a NoC of the NoC based system can be generated from the specification to meet specification requirements.

In an example implementation, the plurality of parameters can include one or a combination of connectivity information of the NoC, dependency information, bandwidth information, and attribute information. Bandwidth information, in an example implementation, can include one or more parameters for guaranteeing a bandwidth for isochronous traffic for a specified period of time. The bandwidth information can further include one or more parameters indicative of traffic jitter. Dependency information can be indicative of dependencies between a plurality of elements of the NoC or a plurality of types of messages in the NoC. Dependency information can also be indicative of non-dependencies between a plurality of elements of the NoC or a plurality of types of messages in the NoC.

In an example implementation, bandwidth information can include one or a combination of bandwidth requirements of messages of one or more transactions, quality of service requirements of the messages of the one or more transactions, latency requirements of the messages of the one or more transactions, and latency requirements of the one or more transactions. In another implementation, connectivity information can include one or a combination of transaction information for one or more messages of the NoC based system indicative of a traffic simulation of the NoC based system, protocol information for message transmission of the NoC, and order information indicative of a sequence for messages of the NoC. Transaction information, on the other hand, in an example implementation, can include one or more transactions, wherein each of the one or more transactions can be indicative of a sequence of hops, and wherein each hop of the sequence of hops indicative of the one or more messages from a source agent to a destination agent. Generation of NoC can include configuring the NoC base system based on the transaction information to transmit the one or more messages for each hop from the source agent to the destination agent according to the sequence of hops for the each of the one or more transactions. In another example implementation, transaction information can be configured to facilitate a system level simulation for at least a subset of the one or more transactions. Attribute information, in an implementation, can include message attribute information indicative of one or a combination of size of messages of one or more transactions, priority of the messages of the one or more transactions, Quality of Service (QoS) of the messages of the one or more transactions, and ordering requirements of the messages of the one or more transactions. System of the present disclosure can include simulation of the NoC based on the plurality of parameters of the specification. System of the present disclosure can further include generating a traffic trace database from the plurality of parameters of the specification for performing the simulation, wherein the database can include one or more traffic trace files, wherein each traffic trace file can be indicative of information to initiate a transaction. Such information to initiate the transaction can be determined based on the plurality of parameters of the specification. Instructions and/or system of the present disclosure can further include selection of a transaction from a plurality of transactions based on the plurality of parameters and a statistical model.

In yet another embodiment, bandwidth information can be indicative of one or a combination of a rate of a transaction, a rate of messages of the transaction, and a rate of one or more hosts of the NoC based system.

In an example implementation, disclosure of the present invention can further include a Network on Chip (NoC) based system configured from a specification. Such a specification can include a plurality of parameters, wherein the plurality of parameters are indicative of information configured to facilitate a performance simulation of the NoC based system, and wherein a NoC of the NoC based system is generated from the specification to meet specification requirements. The plurality of parameters can include, but are not limited to, one or a combination of connectivity information of the NoC, dependency information, bandwidth information, and attribute information. Bandwidth information can include one or more parameters for guaranteeing a bandwidth for isochronous traffic for a specified period of time. Bandwidth information can further include one or more parameters indicative of traffic jitter.

FIG. 4(b) represents a representation 450 showing two flows between two hosts 452 and 454 as a single transaction 456 in accordance with an embodiment of the present disclosure. The two flows of FIG. 4(a) can therefore be represented here as a single transaction. In an example implementation, the specification maintains the relationship between the two messages by representing them as a single transaction between two hops. In an example implementation, the specification can therefore include a collection of such transactions between two and more hosts.

Using transaction-based entries instead of flow level specification into the traffic specification to specify traffic can help overcome the above-mentioned and other known limitations of flow-level traffic specification. One should appreciate that specifications designed using transaction-based entries can also be interchangeably referred to as transactional traffic specification. Using transactional traffic specification allows deadlock to be avoided in source-routed systems, wherein a deadlock prevention algorithm can use the internal dependencies implicitly encoded between hops of transactions to build a deadlock-free NoC design. Transactions also allow much more accurate simulation of the NoC. Having response messages triggered by request arrival allows more complex traffic behaviors to result from simplified specifications. Further, transactional simulations can highlight potential system bottlenecks and deadlock problems that are not detected in a simple point-to-point traffic model. Via extensive evaluation on real world SoC specifications and workloads, simulations involving example implementation specifications can evaluate NoC performance much more effectively when compared with simple point to point NoC simulations while maintaining quick design and evaluation iterations. Example implementations of specifications can provide a high level picture of the traffic requirements of a NoC. The specification language can allow an architect to describe the structure of groups of multi-hop transactions and can support properties both on the transaction as a whole as well as properties of each hop of the transaction.

In an example implementation, transactional traffic specification, also referred to as transaction traffic specification hereinafter, can include transactional information that can be used to design, create, and optimize NoC. The transactional traffic specification can also be used to generate traffic trace files. As illustrated in FIG. 4(a), known specifications only provide an indication of pairwise (point-to-point) connectivity between agents to specify the NoC traffic. However, the required connectivity between hosts may not always be point-to-point, i.e., packets may not always be transmitted directly from one host to another but can have multiple hosts or hosts involved in between, creating multiple dependencies. It is also possible that multiple packets/messages themselves have some inter dependencies. As described above, a given NoC interconnect system can involve a source host, one or more intermediate hosts, and a destination host. In an example illustration, it is also possible that the source host itself is the destination host, however multiple intermediate hosts may still be required to complete the transaction. The transactional traffic specification can include all this transaction information such as inter-dependencies, intermediate hops and their status, which are missing from existing (prior art) flow-level specifications.

In an example implementation, transactional traffic specification can include information on connectivity, inter-dependencies between host/hops, inter-dependency between messages/packets/flits, bandwidth, latency, and message attributes among other descriptions about NoC traffic. Dependency information can describe, for instance, which intermediary hops that, if blocked/fail, could stop and/or hamper transactions from source to destination. In another example implementation, dependency can be determined using a suitable method, for instance, by analysis of sequence of messages. Description of the traffic specification can include explicit dependency information on how, for example, a source is dependent of intermediate hops or in an instance can explicitly describe non-dependency between messages/packets/flits and/or the intermediate hops.

In another example implementation, transactional traffic specification includes description about bandwidth and/or latency such as message latency, transactional latency, execution latency for each hop and/or for the entire transaction. In another example implementation, latency can be based on one or more inter-dependencies described as above. Bandwidth description may contain the bandwidth requirement between each host and hops and overall bandwidth requirement for the full transaction. The bandwidth description can include information about size of links between different hops and between hosts on the NoC. The traffic specification can further include description about message attributes such as size of message, priority of message, type of message, quality of message, and other specification information about the message. A similar attribute such as size, priority, type and quality can also be defined for each packet and/or flit of the packet.

In yet another example implementation, using a transactional traffic specification in source-routed system, potential traffic deadlocks can be avoided as the transactional traffic specification includes transaction level specification with details on internal dependencies between messages and/or NoC hosts. In an example implementation, a deadlock prevention algorithm can use internal dependencies defined in the transactional traffic specification implicitly encoded between hops of transactions to build a deadlock-free NoC design. In an example implementation, transactional traffic specification can also be used to get more accurate simulation of the NoC traffic. A transactional simulation using the transactional traffic specification can highlight potential system bottlenecks and deadlock problems that were not possible to be highlighted in simulations using flow level specification.

Example implementations of transactional traffic specifications can provide a high level view/representation of the traffic requirements of a NoC. The specification language can allow an architect to describe structure of groups of multi-hop transactions, and can support properties both on transaction as a whole as well as properties of each hop of the transaction.

In an example implementation, a separate transactional traffic specification may be written for designing the NoC and a separate transactional traffic specification mat be written for the simulating the NoC.

Figure 5:
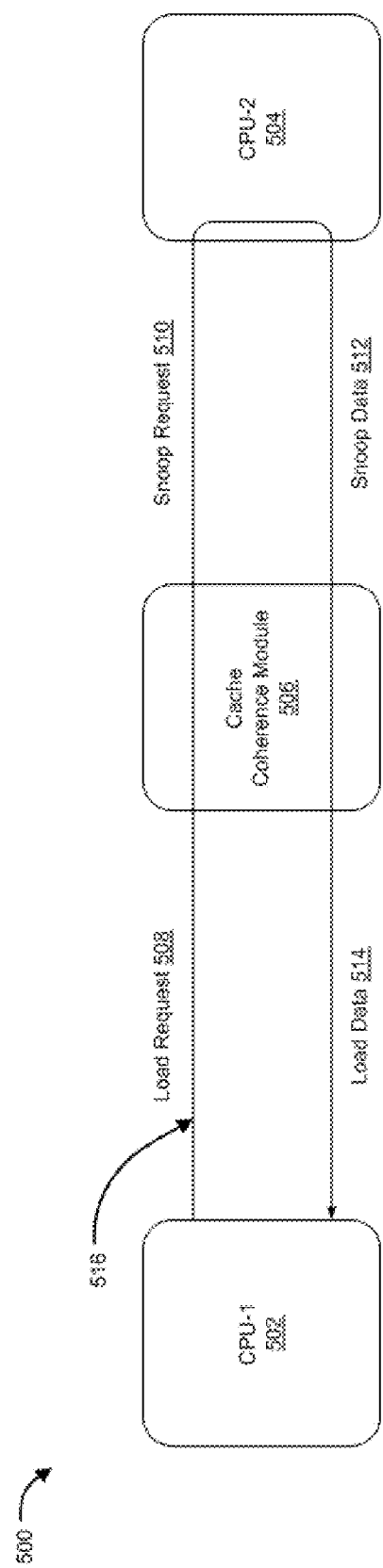
FIG. 5 illustrates a transaction between hosts in accordance with an embodiment of the present disclosure.

In an implementation, through extensive evaluation on real world SoC specifications and workloads, simulations involving example implementation specifications can evaluate NoC performance much more effectively when compared with simple point-to-point NoC simulations while maintaining quick design and evaluation iterations. FIG. 5 illustrates a transaction between hosts in accordance with an embodiment of the present disclosure. The transaction is illustrated with reference to a system 500 having two central processing units CPU-1 502 and CPU-2 504 with a hardware cache coherence module 506 configured between the CPU's 502 and 504 on the NoC. In an example implementation, in case module 506 does not have the requested data, cache coherence module 506 can receive a cached load request 508 from CPU-1 502 and make a snoop request 510 to the CPU-2 504. When the requested data is in the cache of CPU-2 504, CPU-2 504 can respond with the snoop data 512, which can be received by the cache coherence module 506 and then forwarded to the requesting CPU-1 502. The entire sequence of messages can be represented as a single transaction 516 represented by a line in FIG. 5.

To describe the transaction, in an example implementation, CPU 502 and CPU 504 can be represented as CPU_1 and CPU_2 respectively and cache coherence module 506 can be represented as CC for describing the above transactions in the specification. Similarly, port responsible for forwarding the load request can be referred to as LD, port responsible for forwarding the snoop message can be referred to as SN, port responsible for receiving the snoop response can be referred to as SN_RESP, and port responsible for receiving the load data can be referred to as LD_DATA, for purpose of describing the transaction in the specification. The sequence of messages for this transaction can therefore be described as below:

pri 1 rates 0.05 0.1 latency 30 profile 0,1
   CPU_1/ID CPU_2/ID→beats 1 CC/LD/SN→
   beats 1 CPU_1/SN/SN_RESP CPU-2/SN/SN_RESP→
   beats 4 CC/SN_RESP/LD_DATA→
   beats 4 CPU_1/LD_DATA CPU_2/LD_DATA The example description of the above transaction has four properties: 1) priority, 2) message rates, 3) latency target, and 4) corresponding traffic profiles. In the example description of the transaction, "pri 1" can represent the priority of transaction as 1, wherein the priority description can be used for priority-based arbitration at routers. The "rate 0.05 0.1" can be configured to represent two message rates indicative of how frequently this transaction is initiated. This frequency can be measured in terms of the number of messages per cycle, which can be converted into a bandwidth figure by multiplying it with the interface width, number of flits per message, and clock rate of the NoC. For this example, rate of 0.05 can represent average rate 0.05 i.e. one message every 20 cycles, and the rate 0.1 can represent peak rate i.e. one message every 10 cycles. The rate description is important to analyze capacity of the ports for example a message with 3 beats having a transaction rate greater than ⅓ would exceed the capacity of the port.

The next transaction property described in the specification is the latency target, which is described in example specification as "latency 30", indicating the desired completion latency for the transaction to achieve the required system performance. The example transaction has a latency target of 30 cycles, meaning that if it takes more than 30 cycles to complete, the performance of the system will be negatively affected. The last transaction property described in the specification is the profile, wherein each transaction, for example, can be a member of any number of traffic profiles, or traffic modes. By activating only the transactions in one profile, one can easily switch between different traffic modes. Further in the example implementation, transactional traffic specification includes two types of description for input and output ports of different hops, one type for the input and output ports of source and destination, and the other type for input and output port of the intermediate hops. For instance, source(s) of the first hop and destination(s) of the last hop can be specified as host/port, indicating the host that will be taking part in the transaction and which of its ports it will use. In the example transaction, the first hop starts at two possible ports, either the LD port of CPU_1 or the LD port of CPU_2 and therefore the transaction specification describes it as CPU_1/LD and CPU_2/LD.

In an example implementation, intermediate hops can be specified as host/port such as CC/LD/SN, where the first port is the incoming port, for instance LD on which the message may be received, and the second port being the outgoing port SN from where the next message will be transmitted from the intermediate hop. The description illustrates that the message arrived on one port i.e. LD, and was sent by another port i.e. SN. The port can be specified on both ends of the hops as some protocols allow mixing of ports within a hop.

In an example implementation of the proposed transactional traffic specification, each hop in a transaction can describe a beat property such as "beat 1", indicating the number of data chunks/flits that makes up a complete message. This may include the number of flits in the packet for that message. For example, the load and snoop messages may be of each one flit each, while the snoop response and load data messages that carry data, can be of four flits in length as indicated by beat 4. Pairwise bandwidth graph can be computed from an example implementation of the transactional traffic specification by multiplying rate and beats by port widths.

In an example implementation, description of a transaction can be optimized, wherein for instance, a transaction using a protocol having a request, a response, related messages, and a description about one message, can produce other messages. In such cases description about both the message may not be needed to be specified in the specification. Based on the protocol definition, other messages in the sequence can be derived. In another example implementation, a user can provide a partial description of the transaction, based on which the full description can be generated based on the message information and protocol specification.

In an example implementation, multiple transactions having a common pattern such as a CPU sending messages to a memory unit, can be described in the transactional traffic specification as a transaction chain. Such a description about the transaction chain in a transactional traffic specification can be used to enable efficient simulation of multi-hop transactions.

Traffic Chains

Figure 6:
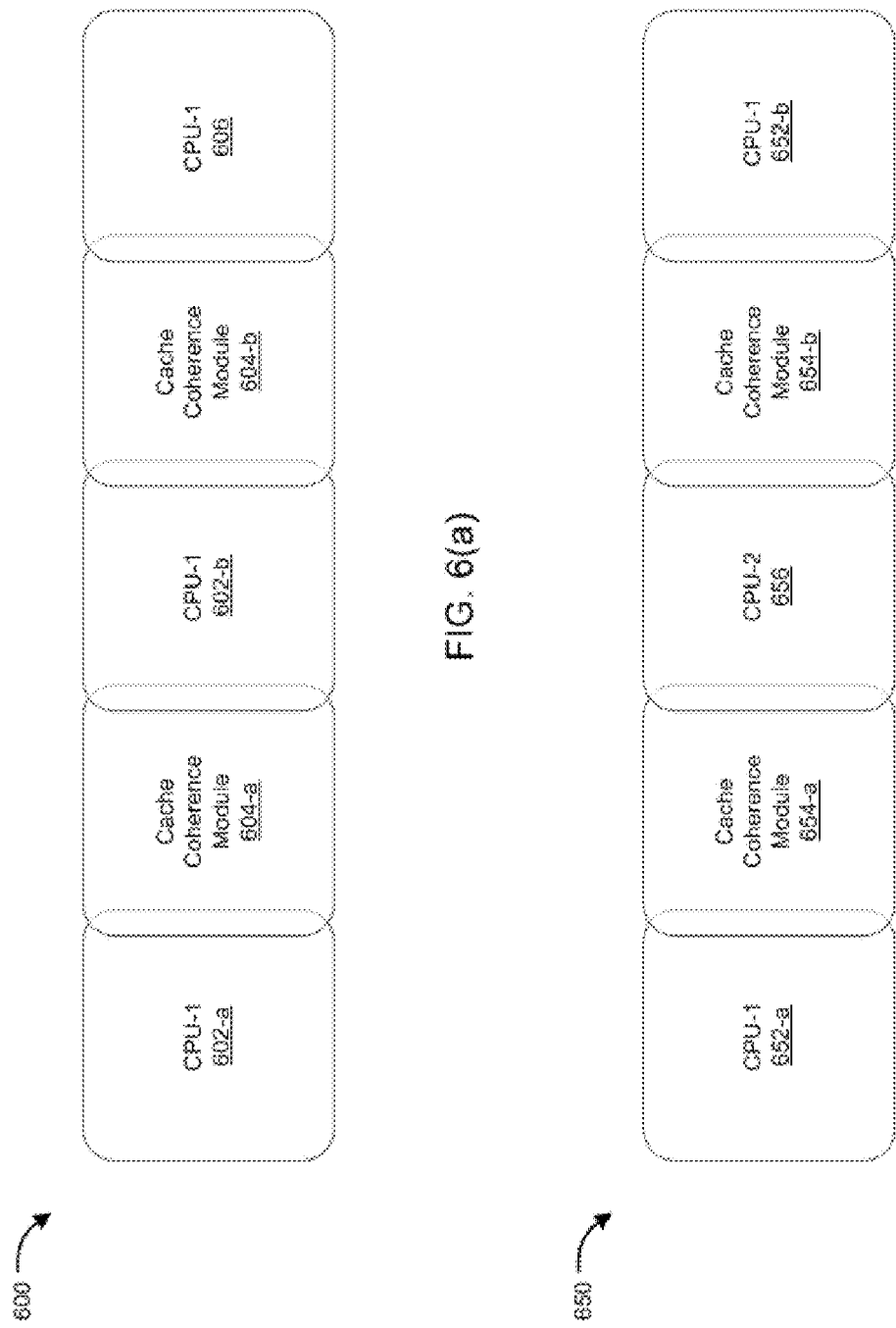
FIG. 6(a) illustrates an example chain constructed for a transaction.
FIG. 6(b) illustrates an example transaction chain made using the chain generation algorithm in accordance with an example embodiment of the present disclosure.

A transaction can be represented as a chain where each hop has a single source/destination. By converting all transactions into chains at the start of the simulation, operation of the hosts can be speeded up as the next message to be sent is already determined. A naive way to convert a transaction into many chains is to make a chain for each possible choice of components at each hop. Such a transaction can make a chain as illustrated in FIG. 6(*a*), which illustrates an example chain 600 that does not account for the scenario described as there is no reason for the coherency controller to snoop the CPU that wants the data, and the controller should not send data to the CPU that did not request the data. The chain as illustrated in FIG. 6(*a*) can be constructed for the transaction described above and the transaction represented in FIG. 5. In the present FIG. 6(*a*), CPU-1 602-*a* and CPU-1 602-*b* can be a single CPU, collectively referred to as CPU-1 602 hereinafter, which has been represented as two instances for the illustration purpose only. Similarly, cache coherence module 604-*a* and cache coherence module 604-*b* can be a single cache coherence module, collectively referred to as cache coherence module 604, which has been represented as two instances for illustration purposes only. In an implementation, CPU-1 602-*a* can send a data request to cache coherence module 604-*a*, which in return can send a request back to CPU-1 602-*b*, thereby giving an misleading representation, meaning that it either sends data to the CPU-1 602(*a*) or sends a snoop request to the CPU-1 602(*a*) that actually had requested for the data. As described above, in present example, the snoop request should have instead been sent to CPU-2 606. For the transaction described above, there is no reason for the coherency controller 604 to snoop request back to CPU-1 602(*a*) that had actually requested for the data, and similarly the coherence controller 604 should not have sent the data to the CPU-2 606 that did not request the data. The transaction chain created above is therefore not providing a clear representation of the transaction, and therefore, in order to generate a transaction chain properly without misleading representation, there needs a chain generation algorithm that can properly represent a transaction a traffic chain.

An example implementation utilizes a chain generation algorithm that is directed to generation of chains that a real system would generate. The chain generation algorithm can use the distinction of request vs. response to eliminate invalid destinations for the current hop based on the type of the current message and the partial chain made so far. Ideally requests should go to new destinations that are not yet part of the chain made so far and similarly, for instance, the responses should go to destinations that are already part of the chain made so far.

Applying this algorithm on the example transaction, only one chain can be constructed that starts at CPU-1: CPU-1→CC→CPU-2→CC→CPU-1.

FIG. 6(*b*) illustrates an exemplary transaction chain 650 made using the proposed chain generation algorithm in accordance with an example embodiment of the present disclosure. The CPU-1 652-*a* and CPU-1 652-*b* is a single CPU-1, collectively referred to as CPU-1 652 hereinafter, which is represented as two instances for the illustration purposes only. Similarly, cache coherence module 654-*a* and cache coherence module 654-*b* is a single cache coherence module collectively called as cache coherence module 654, which is represented as two instances for the illustration purpose only. In an example implementation, CPU-1 652-*a* can send a data request to cache coherence module 654, represented herein as 654-*a*, which in-turn sends a snoop request to CPU-2 656, wherein the CPU-2 656 responds back to the cache coherence module 654, represented here as cache coherence module 654-*b*, on availability of the requested data. The cache coherence module 654, represented here as cache coherence module 654-*b*, then forwards the data to the CPU-1 652, represented herein as 652-*b*. Therefore, a chain as CPU-1→Cache Coherency Module→CPU-2→Cache Coherency Module→CPU-1 is created.

As described above, as the snoop message from the cache coherence module 654 is a request that was originally initiated by CPU-1 652, it cannot go to CPU-1, and because the load data message is a response sent by the CPU-2 656, it cannot go to CPU-2 656.

In an example implementation, the chain generation algorithm is conservative. For instance, if at some point, the traffic specification does not allow any next hop, filtering is not done and the specification is followed as best as possible. An alternative may be to generate no chains for a transaction that does not fit the mold of requests and responses. This allows the algorithm to preserve the intent of the user when the input is already a chain.

In example implementation a transactional traffic specification can be written separately for NoC simulation, where the description of the transaction traffic specification may be very specific as required for the NoC simulation.

Trace Generation

In an example implementation of the NoC simulation, external transaction traces can be used to provide additional flexibility. Such transaction traces can either be computed from a statistical model or recorded from a real system. A transaction trace for a component can include a list of transaction initiating messages and the inter transaction intervals. In the example implementation for instance the traces only can only indicate which chain to simulate and not the entire detail of the transaction.

In an example implementation, transactional traffic specification can be used to generate traffic tracing. As transaction rates are specified for each transaction in the transactional traffic specification, realistic traces can be generated for the transaction that fit the transactional traffic specification. In an example implementation, in order to generate a trace that spans n cycles, a transaction with rate r should send nr messages in the trace. A transaction array can be constructed such that each transaction t, from a particular source appears a nr, times. Once done, the array can be shuffled randomly to form the order in which the messages will be sent. It remains only to compute the delay between messages so that our trace spans n cycles. For instance, if the total number of beats, t, is greater than n, the total traffic specified exceeds the ability of the source to transmit, as it can only send one beat per cycle. In another implementation, a standard rate limiting algorithm can be used to schedule message transmission with gaps between messages so that the average bandwidth over short intervals approximately limits the transmission beat rate to t/n beats per cycle. In another implementation, the NoC can use properties such as burstiness and jitter to this model to make even more realistic traces.

Transactional Simulation

In an example implementation, NoC can use transactional traffic specification of the present disclosure for the transactional simulation. Transactional simulation using the transactional traffic specification of the present disclosure differs from flow-based simulation in providing more acute and detailed simulation. The flow-based simulation using the flow level specification, and the transactional simulation using the transactional traffic specification differ in terms of what happens when a message arrives at a transaction midpoint. In both the simulations, a trace of messages to be sent is used to stimulate the network. For transaction-based simulation, the trace only needs to schedule the first message of each transaction, as the other messages will be triggered upon message reception. When a packet arrives at its destination, the packet has a pointer to the next packet in the chain, if any. The next packet can be inserted into the transmit queue of the network host/hops that will send it. The transmission of this response is delayed to account for processing by that host/hop. If there is no room in the queue, the host cannot accept the message, causing backpressure upstream.

The example implementations of the transaction based simulation may provide benefits through the use of transactional traffic specification over point-to-point simulation that usages flow level specification. For example, the transactional simulation can reproduce all the potential deadlocks that would occur during register transfer level (RTL) simulation. Early detection of potential deadlocks makes the simulation valuable for ensuring deadlock-free traffic on the NoC, and further ensuring that the NoC is constructed properly, down to the routing function and VC assignment level. The accurate modeling of dependencies between VCs and components makes it much more likely for the simulation to highlight potential deadlock that may occur in a real system.

During development of the NoC design and simulation, a number of potential deadlocks, if any, may occur, indicating that that the VC mapping algorithm may not be using an accurate model of dependencies in the system.

Furthermore, by using the transactional traffic specification, the simulation may provide a more realistic representation of the NoC. As the simulator using transaction traffic specification will only generate responses after requests, traffic patterns found during the simulation will more accurately represent the real system. Further, a more accurate picture of the behavior of the network may be provided, allowing correct provisioning of bandwidth. Together these benefits greatly improve the usefulness of the simulator, at a cost of negligible complexity.

NoC Design

In addition to more accurate performance simulations, in an example implementation, transactional traffic specifications can be utilized to design the NoC. Using the transactional traffic specification, the NoC design can produce robust and reliable results and faster designed iterations (if required). As the transactional traffic specification contains inter-dependency information, bandwidth information, latency information, it can be used for route allocation and for establishing other NoC connectivity. The transactional traffic specification can also be useful in facilitating VC assignment that can help design a deadlock free NoC. In an example implementation, the transactional traffic specification can also help in accurate core placement in the NoC.

VC Mapping

During VC assignment, traffic flows can be assigned a route and a VC in the NoC in order to avoid deadlock. Transaction information is useful for optimal VC assignment as the information can be used for leveraging additional dependency information between various flows of a transaction and to ensure that the VC assignment is deadlock free.

A simulation using a flow-based traffic graph may be insufficient to detect and prevent deadlock in the NoC, whereas the transactional traffic specification provides a better simulation and detection of deadlock. Flow-based models treat each message as independent of each other, however in real systems, re-quest/response protocols may be utilized, where the response depends on the request and both the response and request message belongs to a single transaction as described in the transactional traffic specification. For example, consider a cache controller that, on a cache miss, receives a load request on its CPU-facing interface and sends out a load request on a memory-facing interface. Because of limited buffering, when responses cannot be sent, the component will have to stop accepting requests. These dependencies should be included in mapping to prevent interconnect deadlock. Related art techniques to handle such situations include putting requests and responses on separate VCs, however such designs may use excessive VCs for complex coherency protocols.

In an example implementation, the transactional traffic specification can be used for VC assignment on NoC components that account for the dependency between flows of the same transaction. In example implementations, utilization of transactional traffic specification for VC assignment accounts for dependency between flows of the same transaction, by inferring them from multi-hop traffic transactions. For example in a transaction between CPU and memory, one can infer a dependency in the memory from the incoming interface to the outgoing interface. Accounting for these dependencies during VC assignment allows designing of networks that are deadlock free while using far fewer VCs, thereby leading to more efficient NoC design. Furthermore, the resulting design can be deadlock free and correct by construction even for more complex protocols.

Core Placement

As communication costs in the NoC increases with distance between components, repositioning components can greatly affect NoC performance. Careful positioning can reduce latency and congestion however a right position is required, as moving some components closer can increase the distance between other components. There are a wide variety of approaches to the NP-hard problem of component placement in NoC context, from simulated annealing to branch-and-bound techniques. Example implementations described herein can ensure that traffic meets latency targets.

Flow-based traffic models can place latency constraints on pairs of components. For instance, latency between a CPU and a cache controller might be constrained to be less than 5. At the application level, latency to the cache controller is just one part of the delay between a memory request and its response. The application may therefore see the whole transaction latency, which may be optimized.

In an example implementation, specifying the latency as a transaction property instead of a per-hop property may relax the constraints on the placement optimization algorithm. The transaction property as described in the transactional traffic specification can allow the specification to allocate latency between all the hops of that transaction so as to easier find a solution that meets all the constraints of the system.

In an example implementation, a NoC can be generated from a transactional traffic specification having full system level connectivity, dependency information, bandwidth information of messages/packets/flits and/or channels, latency information of message transaction, message attribute information such its size, priority, order among other description of traffic in specification.

According to one embodiment, proposed specification of the present disclosure can be configured to handle any type of route and/or hop sequence, wherein, in a first instance, source and destination hosts can be same with one more intermediate hops. It may also be possible to have a connectivity where the destination goes directly to a source, source goes to a first intermediary, the first intermediary goes to a second intermediary in a cycle, and also goes to the destination. Specification can be configured to capture one or a combination of connectivity, dependencies, bandwidth, latency, and message attributes, whereas traditional specifications only had pair-wise connectivity.

In an implementation, dependency can be determined based on analysis of the sequence of messages, or explicitly from the specification, or explicitly based on non-dependencies. As mentioned above, specification can also be configured to explicitly spell out bandwidth and latency, wherein the latency can be message latency, transaction latency, among other like factors. Latency can therefore be for each hop or full transaction (including a plurality of hops). Message attributes can include size of message, priority, quality of service of the message, and certain other defined information about the message. Bandwidth distribution can include time varying bandwidth distribution such as bandwidth over a period of time, which can be stored in say a table or expressed as a function of time. In an example aspect, bandwidth distribution can be captured from isochronous traffic that can provide certain bandwidth within certain amount of time.

Figure 7:
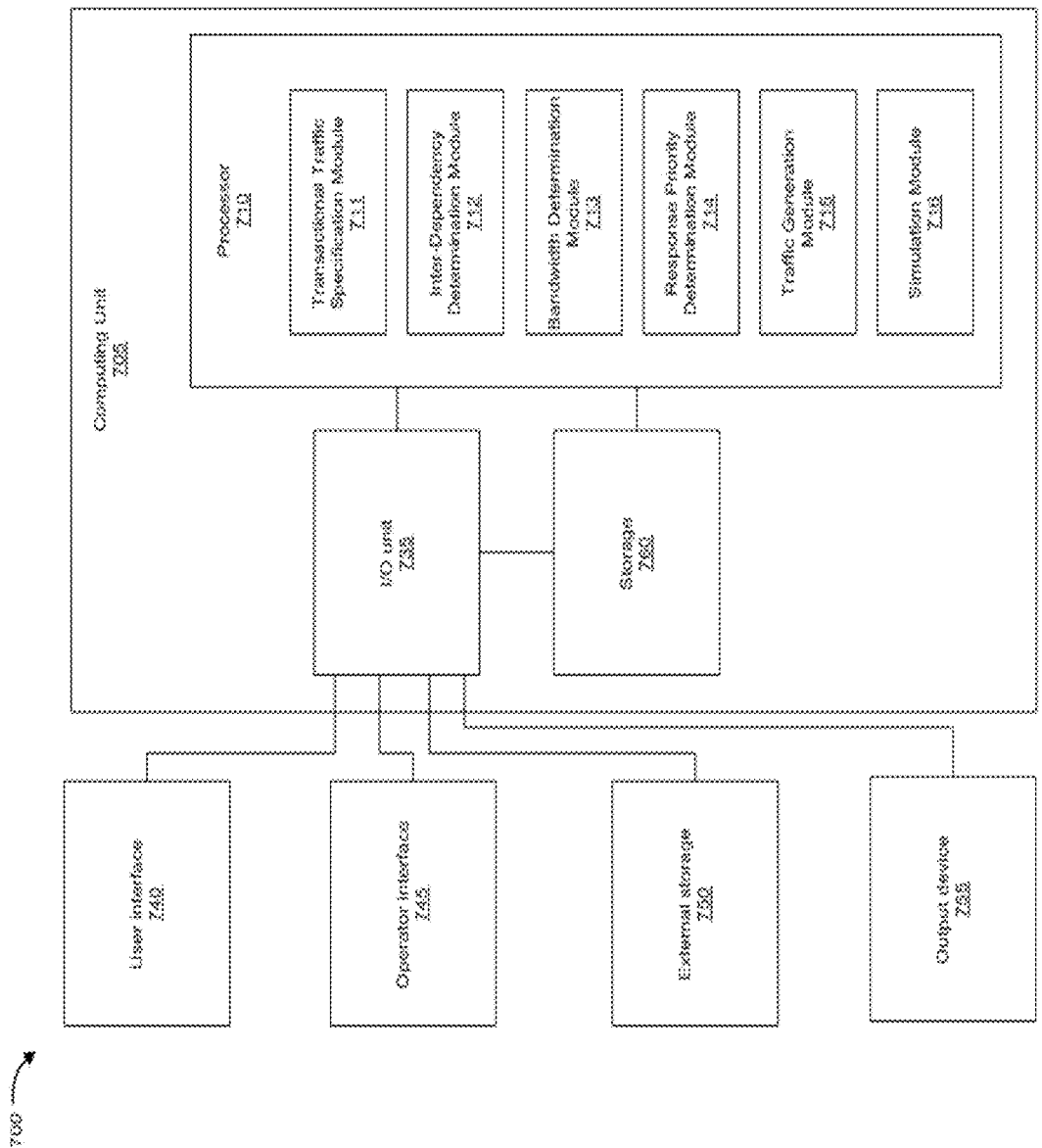
FIG. 7 illustrates an example of computer system on which example implementations can be implemented.

FIG. 7 illustrates an example NoC design and implementation system 700 on which example implementations may be implemented. The computer system 700 includes a server 705 which may involve an I/O unit 735, storage 760, and a processor 710 operable to execute one or more units as known to one of skill in the art. The term "computer-readable medium" as used herein refers to any medium that participates in providing instructions to processor 710 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 740 and operator interfaces 745 which may utilize input devices such as a keyboard, mouse, touch device, or verbal command.

The server 705 may also be connected to an external storage 750, which can contain removable storage such as a portable hard drive, optical media (CD or DVD), disk media or any other medium from which a computer can read executable code. The server may also be connected an output device 755, such as a display to output data and other information to a user, as well as request additional information from a user. The connections from the server 705 to the user interface 740, the operator interface 745, the external storage 750, and the output device 755 may via wireless protocols, such as the 802.11 standards, Bluetooth® or cellular protocols, or via physical transmission media, such as cables or fiber optics. The output device 755 may therefore further act as an input device for interacting with a user.

The processor 710 may execute one or more modules including a transactional traffic specification module 711, an inter-dependency determination module 712, bandwidth determination module 713, response priority determination module 714, a traffic generation module 715, and a simulation module 716, wherein the transactional traffic specification module is 711 can be configured to describe the NoC transactions including information about one or a combination of inter-dependencies between one or more elements, bandwidth allocation, message attributes, and other transactional traffic level parameters/factors/attributes.

In an example embodiment, interdependency determination module 712 can be configured to extract dependency information from transactional traffic specification module 711 to determine inter-dependencies between one or more messages/packets/flits, inter-dependencies between requesting host and destination host, dependencies on intermediate hops, among other dependencies as described in the transactional traffic specification module 711. In an example implementation, the transactional traffic specification module 711 can be configured to generate a transactional traffic specification using one or more parameters such as dependency information, bandwidth information, and attribute information.

In another example embodiment, the NoC design and simulation system 700 can include a bandwidth distribution module 713 configured to determine available bandwidth between hosts and intermediate hops of the NoC and design traffic accordingly based on transactional traffic specification. As explained above, transactional traffic specification can also include information about message size priority and order of all the message of the transaction.

In another example embodiment, the priority determination module 714 can be configured to extract information to analyze and prioritize messages in and out from a host and/or intermediate hops. In an example implementation, using the transactional traffic specification, traffic generation module 715 can be configured to take into account multiple dependencies, priorities, bandwidth, latency and other relevant information and process/handle the traffic accordingly. In another example embodiment, simulation module 716 can simulate the entire NoC using the transactional traffic specification to analyze the NoC and can determine potential deadlock in the NoC Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A non-transitory computer readable medium storing instructions for executing a process, the instructions comprising:

designing a Network on Chip (NoC) specification comprising a plurality of parameters, wherein the plurality of parameters are indicative of information configured to facilitate a design and performance simulation of the NoC based system, wherein the plurality of parameters comprises a plurality of routers and interconnectivities information of the NoC based system, includes: dependency information associated with message dependencies of the NoC based system, bandwidth information, and attribute information; and generating the NoC based system comprising a plurality of routers and interconnectivities, such that the plurality of routers and interconnectivities of the NoC based system are configured to meet the specification requirement; and utilizing the plurality of parameters of the specification utilized to generate the NoC based system to conduct a performance simulation of the NoC based system.

2. The non-transitory computer readable medium of claim 1, wherein the bandwidth information comprises one or more parameters for guaranteeing a bandwidth for isochronous traffic for a specified period of time.

3. The non-transitory computer readable medium of claim 1, wherein the bandwidth information comprises one or more parameters indicative of traffic jitter.

4. The non-transitory computer readable medium of claim 1, wherein the dependency information is indicative of dependencies between a plurality of elements of the NoC based system or a plurality of types of messages in the NoC based system.

5. The non-transitory computer readable medium of claim 1, wherein the dependency information is indicative of non-dependencies between a plurality of elements of the NoC based system or a plurality of types of messages in the NoC based system.

6. The non-transitory computer readable medium of claim 1, wherein the bandwidth information comprises at least one of: bandwidth requirements of messages of one or more transactions, quality of service requirements of the messages of the one or more transactions, latency requirements of the messages of the one or more transactions, and latency requirements of the one or more transactions.

7. The non-transitory computer readable medium of claim 1, wherein the connectivity information comprises at least one of: transaction information for one or more messages of the NoC based system indicative of a traffic simulation of the NoC based system, protocol information for message transmission of the NoC based system, and order information indicative of a sequence for messages of the NoC based system.

8. The non-transitory computer readable medium of claim 7, wherein the transaction information comprises one or more transactions, each of the one or more transactions indicative of a sequence of hops, each hop of the sequence of hops indicative of the one or more messages from a source agent to a destination agent;
wherein the generating the NoC based system comprises configuring the NoC based system based on the transaction information to transmit the one or more messages for each hop from the source agent to the destination agent according to the sequence of hops for the each of the one or more transactions.

9. The non-transitory computer readable medium of claim 8, wherein the transaction information is configured to facilitate a system level simulation for at least a subset of the one or more transactions.

10. The non-transitory computer readable medium of claim 1, wherein the attribute information comprises message attribute information indicative of at least one of: size of messages of one or more transactions, priority of the messages of the one or more transactions, Quality of Service (QoS) of the messages of the one or more transactions, and ordering requirements of the messages of the one or more transactions.

11. The non-transitory computer readable medium of claim 1, wherein the instructions further comprise generating a traffic trace database from the plurality of parameters of the specification for performing the simulation, the traffic trace database comprising one or more traffic trace files, each of the one or more traffic trace files indicative of information to initiate a transaction.

12. The non-transitory computer readable medium of claim 11, wherein the information to initiate the transaction is determined based on the ones of the plurality of parameters of the specification.

13. The non-transitory computer readable medium of claim 12, wherein the instructions further comprise selecting the transaction from a plurality of transactions based on the plurality of parameters and a statistical model.

14. The non-transitory computer readable medium of claim 1, wherein the bandwidth information is indicative of at least one of: a rate of a transaction, a rate of messages of the transaction, and a rate of one or more hosts of the NoC based system.

15. A Network on Chip (NoC) based system comprising:
a plurality of routers and interconnections, configured from a predesigned specification, wherein the specification comprising a plurality of parameters, wherein the plurality of parameters are indicative of information configured to facilitate a design and performance simulation of the NoC based system, wherein the plurality of parameters comprises the plurality of routers and interconnectivities information of the NoC based system includes: dependency information associated with message dependencies of the NoC based system, bandwidth information, and attribute information;
wherein the NoC based system, the plurality of routers and interconnectivities, are generated to meet the specification requirement; and
wherein the plurality of parameters of the specification utilized to generate the NoC based system are configured to utilize in a performance simulation conducted on the NoC based system.

16. The NoC based system of claim 15, wherein the plurality of parameters comprises connectivity information of the NoC and at least one of: dependency information, bandwidth information, and attribute information.

17. The NoC based system of claim 16, wherein the bandwidth information comprises one or more parameters for guaranteeing a bandwidth for isochronous traffic for a specified period of time.

18. The NoC based system of claim 15, wherein the bandwidth information comprises one or more parameters indicative of traffic jitter.

* * * * *